United States Patent
Ali et al.

(10) Patent No.: US 12,530,909 B2
(45) Date of Patent: Jan. 20, 2026

(54) ROAD DEFECT DETECTION

(71) Applicant: GM Global Technology Operations LLC, Detroit, MI (US)

(72) Inventors: Kamran Ali, Troy, MI (US); Donald K. Grimm, Utica, MI (US); Bo Yu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 18/497,254

(22) Filed: Oct. 30, 2023

(65) Prior Publication Data
US 2025/0139990 A1    May 1, 2025

(51) Int. Cl.
*G06V 20/56* (2022.01)
*G06T 7/00* (2017.01)
(Continued)

(52) U.S. Cl.
CPC .......... *G06V 20/588* (2022.01); *G06T 7/0002* (2013.01); *G06T 7/74* (2017.01); *G06V 10/751* (2022.01); *G06V 20/70* (2022.01); *G06T 2207/10016* (2013.01); *G06T 2207/20081* (2013.01); *G06T 2207/30184* (2013.01); *G06T 2207/30244* (2013.01); *G06T 2207/30256* (2013.01)

(58) Field of Classification Search
CPC .......... G06T 2207/20081; G06V 20/56; G06V 20/70
See application file for complete search history.

(56) References Cited

U.S. PATENT DOCUMENTS 11,417,109 B1 * 8/2022 Theimer ................. H04W 4/40
2013/0173208 A1   7/2013 Kuzunishi et al.
(Continued)

FOREIGN PATENT DOCUMENTS

DE    102017121866 A1    10/2018

OTHER PUBLICATIONS

Eriksson, J., Girod, L., Hull, B., Newton, R., Madden, S., & Balakrishnan, H. (Jun. 2008). The pothole patrol: using a mobile sensor network for road surface monitoring. In Proceedings of the 6th international conference on Mobile systems, applications, and services (pp. 29-39). (Year: 2008).*

(Continued)

*Primary Examiner* — Ian L Lemieux
(74) *Attorney, Agent, or Firm* — Vivacqua Crane, PLLC

(57) ABSTRACT

A system for identifying road defects within a roadway ahead of a moving vehicle, includes at least one camera in communication with a system controller and adapted to capture a plurality of time sequential images of the roadway ahead of the moving vehicle, and at least one motion sensor in communication with the system controller and adapted to detect when the vehicle encounters a road defect, the system controller adapted to correlate the road defect with at least one of the plurality of time sequential images of the roadway, analyze, using a computer vision algorithm, the at least one of the plurality of time sequential images, identify, with the computer vision algorithm, the road defect within the at least one of the plurality of time sequential images, and label the identified road defect within the at least one of the plurality of time sequential images.

20 Claims, 6 Drawing Sheets

(51) Int. Cl.
    *G06T 7/73*     (2017.01)
    *G06V 10/75*     (2022.01)
    *G06V 20/70*     (2022.01)

(56) References Cited

U.S. PATENT DOCUMENTS

| | | | |
|---|---|---|---|
| 2020/0026302 A1* | 1/2020 | Wolcott | G06F 18/251 |
| 2022/0044034 A1* | 2/2022 | RoyChowdhury | E01C 23/01 |
| 2023/0256971 A1 | 8/2023 | Buda et al. | |
| 2023/0401954 A1* | 12/2023 | Tamura | G08G 1/0129 |
| 2024/0326837 A1* | 10/2024 | Teman | B60W 50/16 |

OTHER PUBLICATIONS

Wu, C., Wang, Z., Hu, S., Lepine, J., Na, X., Ainalis, D., & Stettler, M. (2020). An automated machine-learning approach for road pothole detection using smartphone sensor data. Sensors, 20(19), 5564. (Year: 2020).*

Thiruppathiraj, S., Kumar, U., & Buchke, S. (Nov. 2020). Automatic pothole classification and segmentation using android smartphone sensors and camera images with machine learning techniques. In 2020 IEEE Region 10 Conference (Tencon) (pp. 1386-1391). IEEE. (Year: 2020).*

Ranyal, E., Sadhu, A., & Jain, K. (2022). Road condition monitoring using smart sensing and artificial intelligence: A review. Sensors, 22(8), 3044. (Year: 2022).*

Ma, N., Fan, J., Wang, W., Wu, J., Jiang, Y., Xie, L., & Fan, R. (2022). Computer vision for road imaging and pothole detection: a state-of-the-art review of systems and algorithms. Transportation safety and Environment, 4(4), tdac026. (Year: 2022).*

Arth, C., Reitmayr, G., & Schmalstieg, D. (Nov. 2012). Full 6dof pose estimation from geo-located images. In Asian Conference on Computer Vision (pp. 705-717). Berlin, Heidelberg: Springer Berlin Heidelberg. (Year: 2012).*

Rathee, M., Bačić, B., & Doborjeh, M. (2023). Automated road defect and anomaly detection for traffic safety: A systematic review. Sensors, 23(12), 5656. (Year: 2023).*

* cited by examiner

ROAD DEFECT DETECTION

INTRODUCTION

The present disclosure relates to a system and method for providing detecting road defects within a roadway prior to hitting such defects.

Vehicles are equipped with many sensors to monitor the environment surrounding the vehicle, and to detect motion of the vehicle that occurs when the vehicle hits defects in a roadway. Motion sensors are able to measure acceleration and inertial changes of the vehicle and suspension components of the vehicle to detect when the vehicle is driving on a rough surface (hitting many small defects) or hitting a pothole (hitting one large defect). However, such systems rely on the sensors "feeling" the defect. It is desirable to detect such defects prior to the vehicle hitting them. Vision systems using cameras can "see" a road defect before the vehicle hits the road defect, but such systems require manual labeling of road defects, and many road defects are too subtle to be identified by a person visually within a camera image. Further, such systems rely on global positioning to determine the location of the road defect for future reference, and do not provide accurate precise information on the location of such defects and the specific lateral location of such road defects within the roadway.

Thus, while current systems and methods achieve their intended purpose, there is a need for a new and improved system and method for detecting defects within a roadway by correlating motion sensor data collected when the vehicle hits a road defect to images captured of the roadway and creating a machine learning model adapted to predict road defects prior to a vehicle hitting such defects.

SUMMARY

According to several aspects of the present disclosure, a method of identifying road defects within a roadway ahead of a moving vehicle includes capturing, with at least one camera in communication with a system controller, a plurality of time sequential images of the roadway ahead of the moving vehicle, detecting, with at least one motion sensor positioned within the vehicle and in communication with the system controller, when the vehicle encounters a road defect, correlating, with the system controller, the road defect detected by the at least one motion sensor with at least one of the plurality of time sequential images of the roadway collected by the at least one camera, analyzing, with the system controller, using a computer vision algorithm, the at least one of the plurality of time sequential images that is correlated to the road defect detected by the at least one motion sensor, identifying, with the system controller and the computer vision algorithm, the road defect within the at least one of the plurality of time sequential images that is correlated to the road defect detected by the at least one motion sensor, and labeling, with the system controller, the identified road defect within the at least one of the plurality of time sequential images that is correlated to the road defect detected by the at least one motion sensor.

According to another aspect, the identifying, with the system controller and the computer vision algorithm, the road defect within the at least one of the plurality of time sequential images that is correlated to the road defect detected by the at least one motion sensor further includes receiving, with the system controller, from a local database in communication with the system controller, data from images previously captured by the vehicle wherein the road defect has been labelled by the system controller, and predicting, with the system controller, using a machine learning model in communication with the system controller and the local database, the location of the road defect in the at least one of the plurality of time sequential images that is correlated to the road defect detected by the at least one motion sensor.

According to another aspect, the method further includes updating the machine learning model with data of the detected road defect from the at least one motion sensor and the at least one of the plurality of time sequential images that is correlated to the road defect detected by the at least one motion sensor.

According to another aspect, the identifying, with the system controller and the computer vision algorithm, the road defect within the at least one of the plurality of time sequential images that is correlated to the road defect detected by the at least one motion sensor further includes receiving, with the system controller, from a remote database in communication with the system controller, data from images previously captured by other vehicles wherein the road defect has been identified and labelled, and predicting, with the system controller, using a global machine learning model in communication with the system controller and the remote database and trained with data from other vehicles stored within the remote database, the location of the road defect in the at least one of the plurality of time sequential images that is correlated to the road defect detected by the at least one motion sensor.

According to another aspect, the method further includes updating the global machine learning model with data of the detected road defect from the at least one motion sensor and the at least one of the plurality of time sequential images that is correlated to the road defect detected by the at least one motion sensor.

According to another aspect, the identifying, with the system controller and the computer vision algorithm, the road defect within the at least one of the plurality of time sequential images that is correlated to the road defect detected by the at least one motion sensor further includes receiving, with the system controller, from a remote database in communication with the system controller, data from images previously captured by other vehicles with contextual features matching the vehicle wherein the road defect has been identified and labelled, and predicting, with the system controller, using a contextual global machine learning model in communication with the system controller and the remote database and trained with data from other vehicle stored within the remote database, the location of the road defect in the at least one of the plurality of time sequential images that is correlated to the road defect detected by the at least one motion sensor.

According to another aspect, the correlating, with the system controller, the road defect detected by the at least one motion sensor with at least one of the plurality of time sequential images of the roadway collected by the at least one camera further includes detecting, at time $t_n$, with the at least one motion sensor, the road defect, and calculating, with a position algorithm in communication with the system controller a pose of the at least one camera at time $t_n$, a relative position of the road defect relative to the at least one motion sensor and the at least one camera at time $t_n$, a pose of the at least one camera for the at least one of the plurality of time sequential images that is correlated to the road defect detected by the at least one motion sensor, at time $t_{n-x}$, and a relative position of the road defect within the at least one of the plurality of time sequential images that is correlated to the road defect detected by the at least one motion sensor, at time $t_{n-x}$.

According to another aspect, the method further includes determining, with the system controller, a lateral position of the road defect within the roadway.

According to another aspect, the determining, with the system controller, a lateral position of the road defect within the roadway further includes receiving, with the system controller, from the at least one motion sensor, data related to a relative severity of the road defect at different lateral locations across the roadway, wherein the at least one motion sensor includes a plurality of motion sensors located at different lateral positions within the vehicle, and calculating, with the system controller, a lateral severity distribution for the road defect.

According to another aspect, the determining, with the system controller, a lateral position of the road defect within the roadway further includes receiving, with the system controller, from a remote database in communication with the system controller, data related to a relative severity of the road defect at different lateral locations across the roadway collected previously by other vehicles, predicting, with the system controller, using a global machine learning model in communication with the system controller and the remote database and trained with data related to a relative severity of the road defect at different lateral locations across the roadway collected previously by other vehicles stored within the remote database, a lateral severity distribution for the road defect, and updating the global machine learning model with data received from the plurality of motion sensors located at different lateral positions within the vehicle.

According to several aspects of the present disclosure, a system for identifying road defects within a roadway ahead of a moving vehicle includes at least one camera in communication with a system controller and adapted to capture a plurality of time sequential images of the roadway ahead of the moving vehicle, and at least one motion sensor in communication with the system controller and adapted to detect when the vehicle encounters a road defect, the system controller adapted to correlate the road defect detected by the at least one motion sensor with at least one of the plurality of time sequential images of the roadway collected by the at least one camera, analyze, using a computer vision algorithm, the at least one of the plurality of time sequential images that is correlated to the road defect detected by the at least one motion sensor, identify, with the computer vision algorithm, the road defect within the at least one of the plurality of time sequential images that is correlated to the road defect detected by the at least one motion sensor, and label the identified road defect within the at least one of the plurality of time sequential images that is correlated to the road defect detected by the at least one motion sensor.

According to another aspect, when identifying the road defect within the at least one of the plurality of time sequential images that is correlated to the road defect detected by the at least one motion sensor, the system controller is further adapted to receive, from a local database in communication with the system controller, data from images previously captured by the vehicle wherein the road defect has been labelled by the system controller, predict, using a machine learning model in communication with the system controller and the local database, the location of the road defect in the at least one of the plurality of time sequential images that is correlated to the road defect detected by the at least one motion sensor, and update the machine learning model with data of the detected road defect from the at least one motion sensor and the at least one of the plurality of time sequential images that is correlated to the road defect detected by the at least one motion sensor.

According to another aspect, when identifying the road defect within the at least one of the plurality of time sequential images that is correlated to the road defect detected by the at least one motion sensor, the system controller is further adapted to receive, from a remote database in communication with the system controller, data from images previously captured by other vehicles wherein the road defect has been identified and labelled, predict, using a global machine learning model in communication with the system controller and the remote database and trained with data from other vehicles stored within the remote database, the location of the road defect in the at least one of the plurality of time sequential images that is correlated to the road defect detected by the at least one motion sensor, and update the global machine learning model with data of the detected road defect from the at least one motion sensor and the at least one of the plurality of time sequential images that is correlated to the road defect detected by the at least one motion sensor.

According to another aspect, when identifying the road defect within the at least one of the plurality of time sequential images that is correlated to the road defect detected by the at least one motion sensor, the system controller is further adapted to receive, from a remote database in communication with the system controller, data from images previously captured by other vehicles with contextual features matching the vehicle wherein the road defect has been identified and labelled, predict, using a contextual global machine learning model in communication with the system controller and the remote database and trained with data from other vehicle stored within the remote database, the location of the road defect in the at least one of the plurality of time sequential images that is correlated to the road defect detected by the at least one motion sensor, and update the contextual global machine learning model with data of the detected road defect from the at least one motion sensor and the at least one of the plurality of time sequential images that is correlated to the road defect detected by the at least one motion sensor.

According to another aspect, when correlating the road defect detected by the at least one motion sensor with at least one of the plurality of time sequential images of the roadway collected by the at least one camera, the system controller is further adapted to detect, at time $t_n$, with the at least one motion sensor, the road defect, and calculate, with a position algorithm in communication with the system controller a pose of the at least one camera at time $t_n$, a relative position of the road defect relative to the at least one motion sensor and the at least one camera at time $t_n$, a pose of the at least one camera for the at least one of the plurality of time sequential images that is correlated to the road defect detected by the at least one motion sensor, at time $t_{n-x}$, and a relative position of the road defect within the at least one of the plurality of time sequential images that is correlated to the road defect detected by the at least one motion sensor, at time $t_{n-x}$.

According to another aspect, the system controller is further adapted to determine a lateral position of the road defect within the roadway.

According to another aspect, when determining a lateral position of the road defect within the roadway, the system controller is further adapted to receive, from the at least one motion sensor, data related to a relative severity of the road defect at different lateral locations across the roadway, wherein the at least one motion sensor includes a plurality of motion sensors located at different lateral positions within the vehicle, and calculate a lateral severity distribution for the road defect.

According to another aspect, when determining a lateral position of the road defect within the roadway, the system controller is further adapted to receive, from a remote database in communication with the system controller, data related to a relative severity of the road defect at different lateral locations across the roadway collected previously by other vehicles, predict, using a global machine learning model in communication with the system controller and the remote database and trained with data related to a relative severity of the road defect at different lateral locations across the roadway collected previously by other vehicles stored within the remote database, a lateral severity distribution for the road defect, and update the global machine learning model with data received from the plurality of motion sensors located at different lateral positions within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
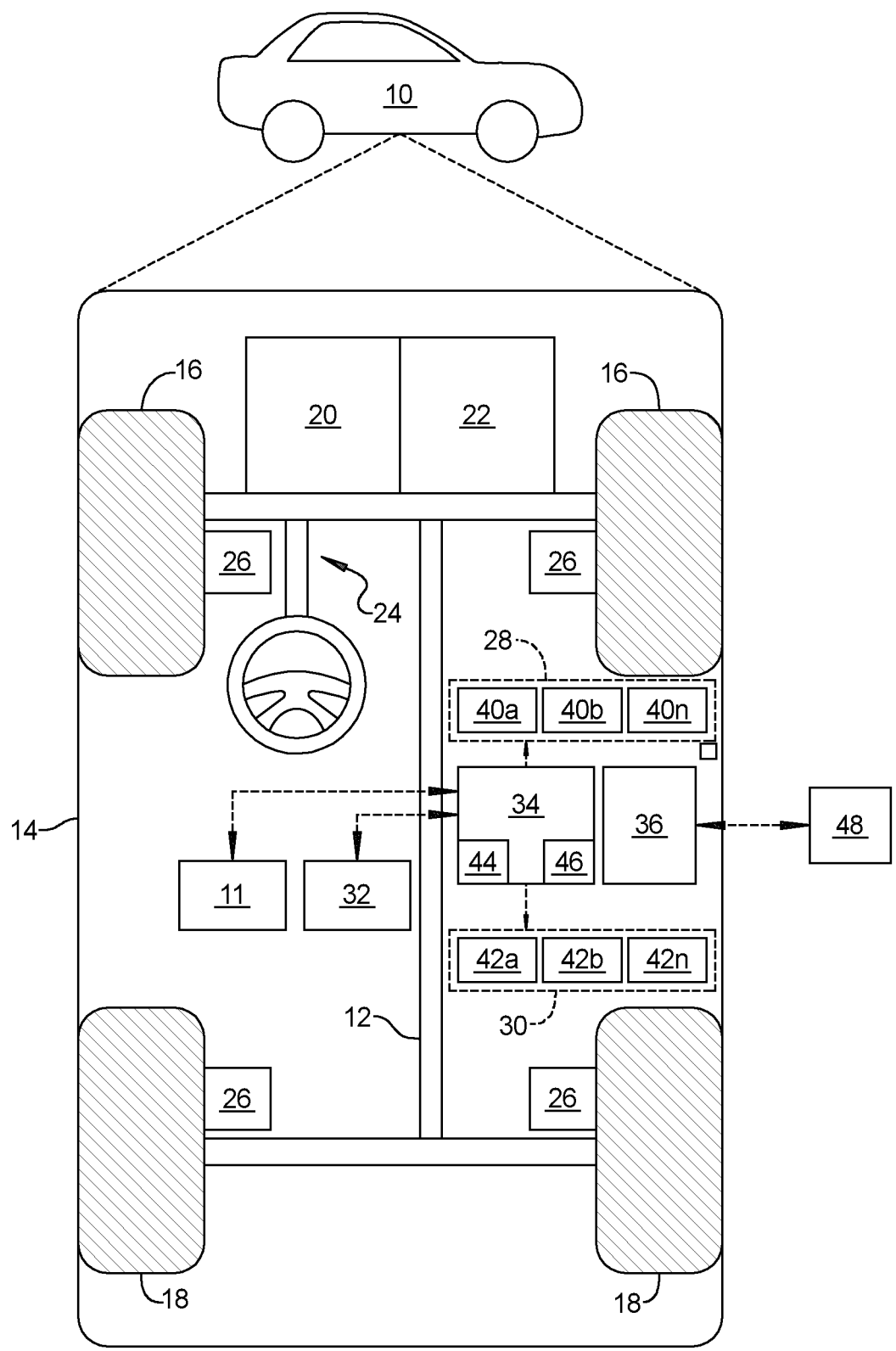
FIG. 1 is a schematic diagram of a vehicle having a system for identifying road defects within a roadway according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for detecting road defects within a roadway ahead of the vehicle 10 as the vehicle 10 moves along a roadway in accordance with various embodiments. In general, the system 11 works in conjunction with other systems within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
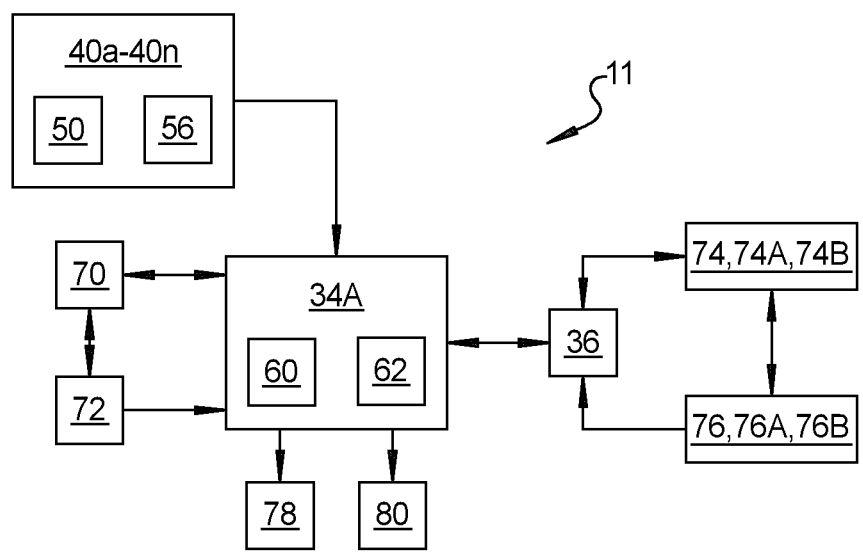
FIG. 2 is a schematic diagram of the system according to an exemplary embodiment.

Referring to FIG. 2 a schematic diagram of the system 11 is shown. The system 11 includes a system controller 34A in communication with the plurality of sensing devices (on-board sensors) 40a-40n. The system controller 34A may be the vehicle controller 34, or the system controller 34A may be a separate controller in communication with the vehicle controller 34. The plurality of onboard sensors 40a-40n, includes at least one camera 50 in communication with a system controller 34A and adapted to capture a plurality of time sequential images 52 of the roadway 54 ahead of the moving vehicle 10, and at least one motion sensor 56 in communication with the system controller 34A and adapted to detect when the vehicle 10 encounters a road defect 58.

Figure 3:
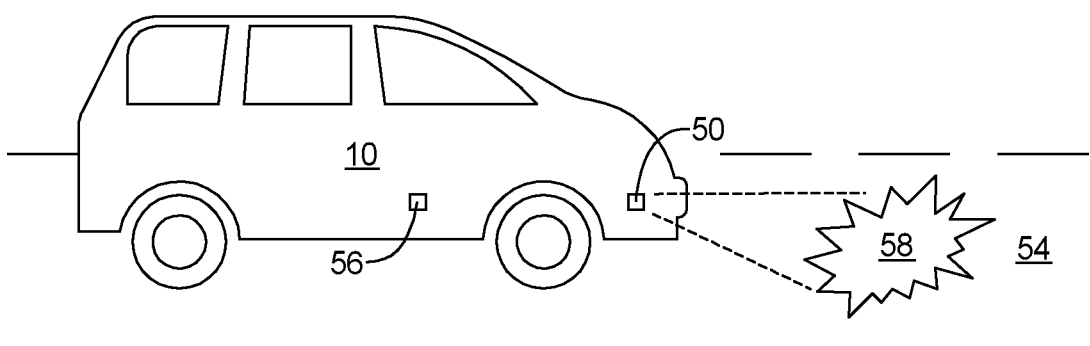
FIG. 3 is a schematic diagram of a vehicle approaching a road defect on a roadway.

The at least one camera 50 takes sequential images 52 of the roadway 54 as the vehicle 10 travels along the roadway 54. Referring to FIG. 3, the camera 50 captures images of the roadway 54 in front of the moving vehicle 10. As shown, the camera 50 captures images 52 of the roadway 54 including a road defect 58, as shown a pothole, within the roadway 54 in front of the vehicle 10. The camera 50 may be any type of camera known in the industry adapted to capture images in proximity to a vehicle 10. Systems exist that use cameras to capture images of a roadway 54 in front of a vehicle 10 and use computer vision algorithms to identify objects such as other vehicles, pedestrians, and road defects in the path of a vehicle 10. However, such systems are only able to identify road defects that have been manually labelled as such. Further, such systems rely on a vehicle's global positioning system to obtain location information about the road defect 56 that is not precisely accurate.

Figure 4:
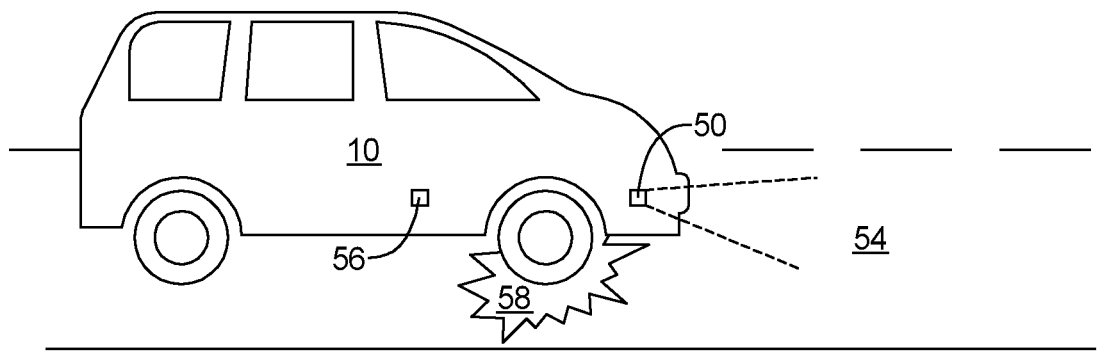
FIG. 4 is a schematic diagram of the vehicle shown in FIG. 3 hitting the road defect on the roadway.

Referring to FIG. 4, the at least one motion sensor 56 detects when the vehicle 10 encounters the road defect 58 (pothole). The use of motion sensors to detect and measure road defects and road roughness is well known in the industry. Road defects 58 can be sensed using a variety of vehicle sensors. For example, wheel rotational differences can provide data related to road roughness or impact with a road defect, such as a pothole, but do not provide precise information related to a lateral location of the road defect. Inertial sensors (longitudinal, lateral and vertical) can provide acceleration data to augment other sensor readings and enable event type differentiation (e.g., pothole vs. speed bump) without providing precise lateral location. Semi-active and active suspension systems that improve ride comfort based on magnetorheological, electrorheological and electromagnetic actuators report shock absorber displacement measurements at each wheel and enable more precise indication of road defects and road roughness experienced at each wheel. Such systems normalize the various sensor readings to account for wheel size/tire profile and tire pressure, vehicle type (sport sedan/SUV, etc.) and ambient environmental differences.

Thus, the at least one camera 50 is somewhat useful for providing visual identification of objects, including road defects 58, within the roadway 54 in front of a vehicle 10 by "seeing" such road defects 58 within images 52 captured by the at least one camera 50, and the at least one motion sensor 56 is useful for "feeling" the impact when the vehicle 10 actually encounters the road defect 58. In an exemplary embodiment, the system controller 34A is adapted to correlate a road defect 58 detected by the at least one motion sensor 56 with at least one of a plurality of time sequential images 52 of the roadway 54 collected by the at least one camera 50.

The at least one camera 50 captures the plurality of time sequential images 52 leading up to the road defect 58, some of the plurality of time sequential images 52 including the road defect 58, and when the at least one motion sensor 56 detects that the vehicle 10 has impacted the road defect 58 the system controller 34A looks back at the plurality of time sequential images 52 to identify at least one of the plurality of time sequential images 52 that includes the road defect 58.

The system controller 34A further analyzes, using a computer vision algorithm 60, the at least one of the plurality of time sequential images 52 that is correlated to the road defect 58 detected by the at least one motion sensor 56 to identify, with the computer vision algorithm 60, the road defect 58 within the at least one of the plurality of time sequential images 52 that is correlated to the road defect 58 detected by the at least one motion sensor 56 and labels the identified road defect 58 within the at least one of the plurality of time sequential images 52 that is correlated to the road defect 58 detected by the at least one motion sensor 56.

Figure 5A:
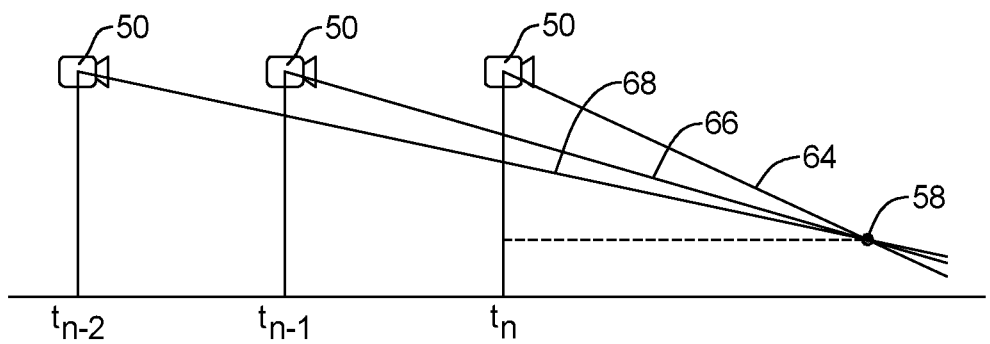
FIG. 5A is a schematic diagram representing a timeline of the vehicle approaching the road defect within the roadway.
Figure 5B:
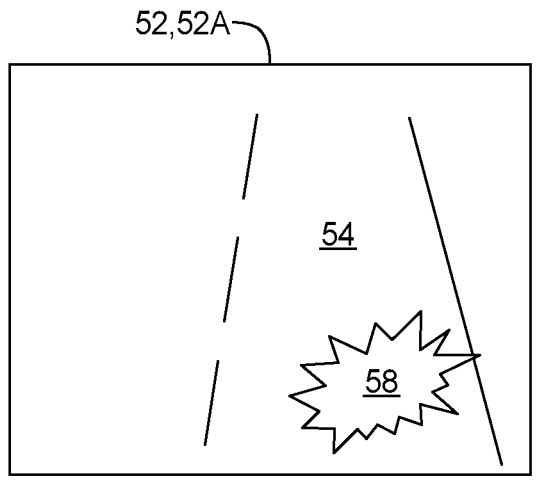
FIG. 5B is a schematic view of an image captured by the at least one camera at time $t_{n-1}$.
Figure 5C:
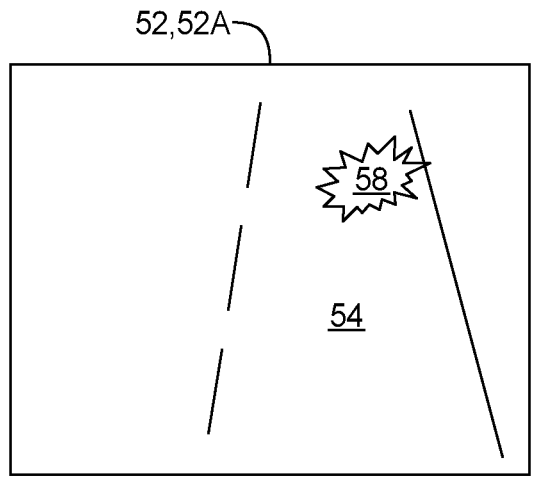
FIG. 5C is a schematic view of an image captured by the at least one camera at time $t_{n-2}$.

Referring to FIG. 5A, in an exemplary embodiment, when correlating the road defect 58 detected by the at least one motion sensor 56 with at least one of the plurality of time sequential images 52 of the roadway 54 collected by the at least one camera 50, the system controller 34A is further adapted to detect, at time $t_n$, with the at least one motion sensor 56, the road defect 58. Time $t_n$ is the time that the vehicle 10 physically encounters the road defect 58. Referring to FIG. 4, $t_n$ is the moment when the front tire 16 of the vehicle 10 physically hits the road defect 58 (pothole). Referring to FIG. 5A and FIG. 5B, time $t_{n-1}$ represents the moment, prior to the vehicle 10 hitting the road defect 58, when the at least one camera 50 captured an image 52A of the roadway 54 that includes the road defect 58 within the image 52A. Referring to FIG. 5A and FIG. 5C, time $t_{n-2}$ represents the moment, prior to time $t_{n-1}$, when the at least one camera 50 captured an image 52B of the roadway 54 that includes the road defect within the image. Thus, in this example, prior to the vehicle 10 encountering the road defect 58, as shown in FIG. 4, two images 52A, 52B were captured by the at least one camera 50, as shown in FIG. 3, that include the road defect 58, as shown in FIG. 5B and FIG. 5C.

The system controller 34A uses a position algorithm 62 in communication with the system controller 34A, to calculate a pose of the at least one camera 50 at time $t_n$, given as $t_n(x, y, z, \alpha, \beta, \gamma)$, wherein, x, y and z represent traditional three-dimensional coordinates, $\alpha$ represents roll of the vehicle 10, and thus, the camera 50, $\beta$ represents pitch of the vehicle 10, and thus the camera 50, and $\gamma$ represents yaw of the vehicle 10, and thus the camera 50. The pose of the camera 50 is the six-dimensional location of the camera based on the quantitative values for the variables x, y, z, $\alpha$, $\beta$, $\gamma$, such values measured and provided to the system controller 34A by various sensors 40a-40n within the vehicle 10.

The system controller 34A is further adapted to calculate, with the position algorithm 62, a relative position of the road defect 58 relative to the at least one camera 50, and, since the at least one camera 50 and the at least one motion sensor 56 are mounted to the same rigid structure (the vehicle 10), relative to the at least one motion sensor 56, at time $t_n$. Thus, the system controller 34A can positionally translate from the position of the road defect 58 back to the position of the at least one camera 50, at time $t_n$, as indicated by line 64 at the point of impact. Further, the system controller 34A, using the positional algorithm 62, calculates a six-dimensional pose of the at least one camera 50 for the at least one of the plurality of time sequential images 52A, 52B that is correlated to the road defect 58 detected by the at least one motion sensor 56, at time $t_{n-x}$, wherein, $t_{n-x}$ represents the times ($t_{n-1}$, $t_{n-2}$) at which the plurality of time sequential images 52A, 52B were captured.

In this example, the at least one of the plurality of time sequential images 52A, 52B that is correlated to the road defect 58 detected by the at least one motion sensor 56 includes the image 52A captured at time $t_{n-1}$ and the image 52B captured at time $t_{n-2}$. The six dimensional pose of the at least one camera 50 at time $t_{n-1}$ is given as $t_{n-1}(x, y, z, \alpha, \beta, \gamma)$, and the six-dimensional pose of the at least one camera 50 at time $t_{n-2}$ is given as $t_{n-2}(x, y, z, \alpha, \beta, \gamma)$. Finally, the system controller 34A, using the positional algorithm 62, calculates a relative position of the road defect 58 within each of the at least one of the plurality of time sequential images 52 (the image 52A captured at time $t_{n-1}$ and the image 52B captured at time $t_{n-2}$) that is correlated to the road defect 58 detected by the at least one motion sensor 56, at time $t_{n-x}$, as indicated by lines 66 and 68 respectively. Since the pose is known for each of the correlated images 52A, 52B, the position of the road defect 58 can be translated back to the images 52A, 52B captured at time $t_{n-1}$ and time $t_{n-2}$.

In an exemplary embodiment, when identifying the road defect 58 within the at least one of the plurality of time sequential images 52 that is correlated to the road defect 58 detected by the at least one motion sensor 56, the system controller 34A is further adapted to receive data from images previously captured by the vehicle 10 that are stored within a local database 70 in communication with the system controller 34A. Such images include past occurrences wherein the road defect 58 was detected, identified and labelled which are then used by the system controller 34A and a machine learning model 72 to predict the location of the road defect 58 in the at least one of the plurality of time sequential images 52 that is correlated to the road defect 58 detected by the at least one motion sensor 56.

The machine learning model 72 uses past instances of the vehicle 10 encountering the road defect 58, and the labelled images captured during such past instances to bolster real-time data collected by the at least one motion sensor 56 and more accurately correlate the "felt" detection of the road defect 58 back to the plurality of time sequential images 52 captured by the at least one camera 50. Thus, in the future, when the vehicle 10 approaches the road defect 58, the system controller 34A and the machine learning model 72 will have access to more accurately labelled images that include the road defect 58. The machine learning model 72, based on past occurrences, is taught to recognize the road defect 58 based on real-time images 52A, 52B captured by the vehicle 10, allowing the system controller 34A and machine learning model 72 to accurately identify the road defect 58 in front of the vehicle 10 before the vehicle 10 physically encounters the road defect 58. Each time the vehicle 10 encounters the road defect 58, the system controller 34A updates the machine learning model 72 with data of the detected road defect 58 from the at least one motion sensor 56 and the at least one of the plurality of time sequential images 52A, 52B that is correlated to the road defect 58 detected by the at least one motion sensor 56 to continuously improve the accuracy of the machine learning model 72.

In another exemplary embodiment, when identifying the road defect 58 within the at least one of the plurality of time sequential images 52 that is correlated to the road defect 58 detected by the at least one motion sensor 56, the system controller 34A is further adapted to receive data from images previously captured by other vehicles that are stored within a remote database 74 in communication with the system controller 34A. Such images include past occurrences wherein the road defect 58 was detected, identified and labelled by other vehicles that encounter the road defect 58 which are then used by the system controller 34A and a global machine learning model 76 to predict the location of the road defect 58 in the at least one of the plurality of time sequential images 52 that is correlated to the road defect 58 detected by the at least one motion sensor 56.

The global machine learning model 76 uses past instances of other vehicles encountering the road defect 58, and the labelled images captured by such other vehicles during such past instances to bolster real-time data collected by the at least one motion sensor 56 and more accurately correlate the "felt" detection of the road defect 58 by the at least one motion sensor 56 back to the plurality of time sequential images 52 captured by the at least one camera 50. The global machine learning model 76, based on past occurrences, is taught to recognize the road defect 58 based on real-time images captured by the vehicle 10, allowing the system controller 34A and the global machine learning model 76 to accurately identify the road defect 58 in front of the vehicle 10 before the vehicle 10 physically encounters the road defect 58. Each time the vehicle 10 encounters the road defect 58, the system controller 34A updates the global machine learning model 76 with data of the detected road defect 58 from the at least one motion sensor 56 and the at least one of the plurality of time sequential images 52A, 52B that is correlated to the road defect 58 detected by the at least one motion sensor 56 to continuously improve the accuracy of the global machine learning model 76. Data from the global machine learning model 76 can be uploaded to mapping applications, allowing the road defect 58 to be identified ahead of time by users within the vehicle, via a human machine interface 78, or by a vehicle control module 80 within an autonomous vehicle to make route decisions.

Various techniques are employed to extract meaningful features from sensor readings and data, including time-series analysis, frequency-domain analysis, and spatial-temporal patterns. The machine learning model or the global machine learning model may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The global machine learning model 76 is trained with data collected from a plurality of different vehicles. A diverse dataset is collected from vehicles equipped with sensors such as GPS, accelerometers, cameras, radar, and LIDAR. The data encompasses various driving scenarios, including urban, highway, and off-road driving. Before feeding the data into the global machine learning model, preprocessing steps are undertaken to remove noise, handle missing values, and standardize features.

An essential step is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for identifying the road defect within the at least one of the plurality of time sequential images captured by the at least one camera. The global machine learning model 76 is trained on a labeled dataset and evaluated using various performance metrics such as accuracy, precision, recall, F1-score, and confusion matrix. The hyperparameters of the models are tuned to achieve optimal results. The global machine learning model 76 is further trained on training data and will learn to map input features to the corresponding probabilities.

Real-time data from occurrences of the system controller 34A identifying and labelling the road defect 58 are saved to the remote database 74 and used to continuously update the global machine learning model 76. Thus, the system controller 34A uses the global machine learning model 76 and machine learning techniques to more accurately identify and label the road defect 58 within correlated images 52A, 52B based on analyzing the real-time data collected by the at least one camera 50 and the at least one motion sensor 56 and analysis of captured images 52A, 52B using computer vision and image recognition techniques and data from past occurrences from the remote database 74.

In another exemplary embodiment, the global machine learning model 76 is a contextual global machine learning model 76A. Generally, the global machine learning model 76 is created and taught with data from models obtained from all other participating vehicles. This data is "aggregated" towards a single global machine learning model 76. Traditional federated learning techniques simply combine the locally trained models from individual vehicles within the cloud-based global machine learning model 76. However, this can lose the knowledge learned by the locally trained models and degrades the performance of the aggregated global machine learning model 76. When the "aggregated" global machine learning model 76 is sent back to vehicles, it corrupts the local learnings.

In another exemplary embodiment, when identifying the road defect within the at least one of the plurality of time sequential images 52 that is correlated to the road defect 58 detected by the at least one motion sensor 56, the system controller 34A is further adapted to receive data from images previously captured by other vehicles that are stored within a remote database 74A in communication with the system controller 34A. Such images include past occurrences wherein the road defect 58 was detected, identified and labelled by other vehicles that encounter the road defect 58 which are then used by the system controller 34A and a contextual global machine learning model 76A to predict the location of the road defect 58 in the at least one of the plurality of time sequential images 52 that is correlated to the road defect 58 detected by the at least one motion sensor 56.

Local machine learning model corruption is reduced by grouping different models based on contextual features, maintaining a separate contextual global machine learning model 76A for each contextual scenario. Contextual features can be based on type of road, model of the vehicle, contextual feature extraction using vehicle sensors (e.g., lighting conditions), and/or other user provided information. When locally trained model parameters are transmitted to a cloud-based server for aggregation within the global machine learning model, the server first uses the contextual information to search for (or create a new if one does not exist) the appropriate contextual global machine learning model 76A and then performs the global aggregation with that contextual global machine learning model 76A.

In an exemplary embodiment, the system controller 34A is further adapted to determine a lateral position of the road defect 58 within the roadway 54. Often, such as with a pothole, a road defect 58 does not extend across the entire width of the roadway 54 lane, or, if the road defect 58 does extend fully across the lane, the severity is different across the width. When a human driver sees a pothole, they are able to maneuver the vehicle 10 to avoid the pothole, therefore, it is useful, particularly in an autonomous vehicle 10, for the system controller 34A to be able to detect the lateral location and/or severity variance of a road defect 58 laterally across the roadway 54.

In an exemplary embodiment, when determining a lateral position of the road defect 58 within the roadway 54, the system controller 34A is further adapted to receive, from the at least one motion sensor 56, data related to a relative severity of the road defect 58 at different lateral locations across the roadway 54, wherein the at least one motion sensor 56 includes a plurality of motion sensors located at different lateral positions within the vehicle 10.

Figure 6:
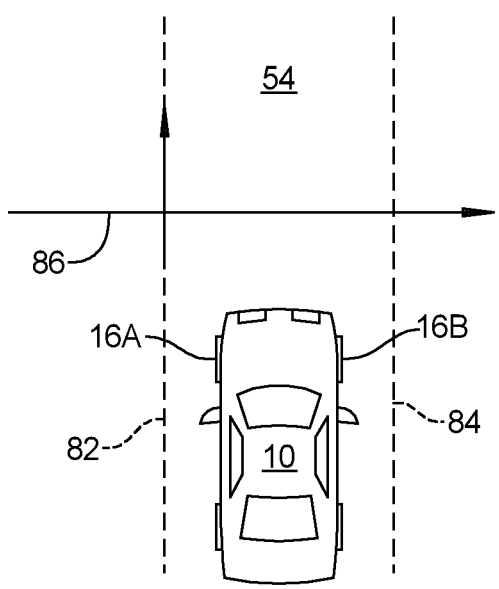
FIG. 6 is a schematic diagram illustrating a coordinate system used to illustrate severity of a road defect laterally across the roadway.
Figure 7:
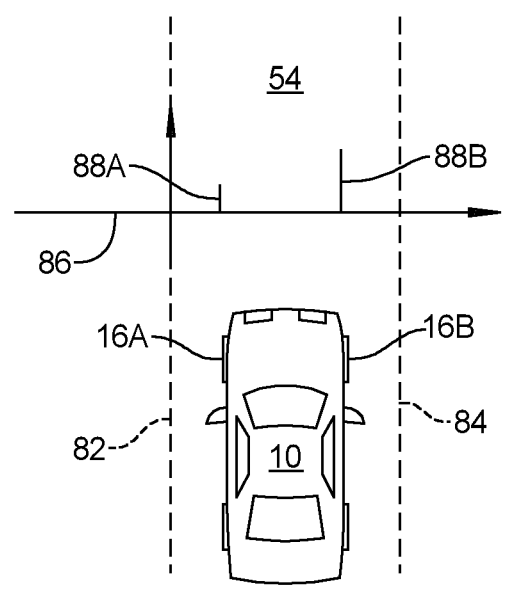
FIG. 7 is the schematic diagram of FIG. 6, including input from motion sensors on the vehicle.
Figure 8:
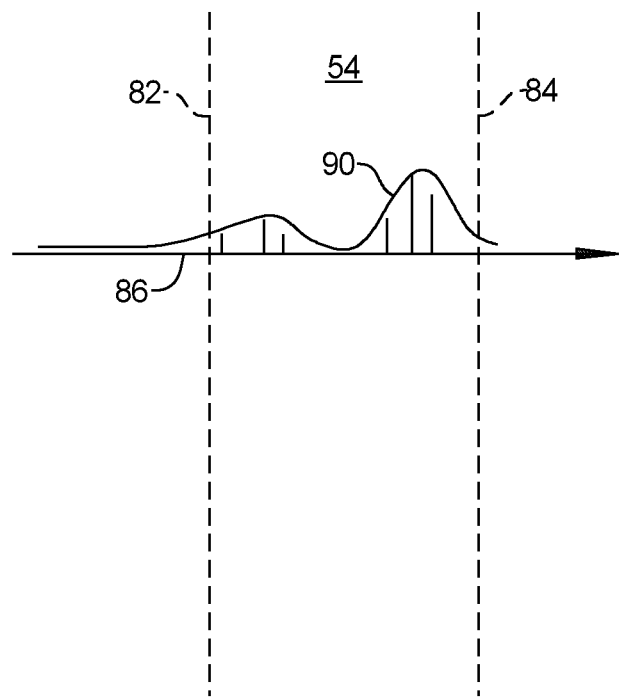
FIG. 8 is a schematic representation of a lateral severity probability distribution.
Figure 9:
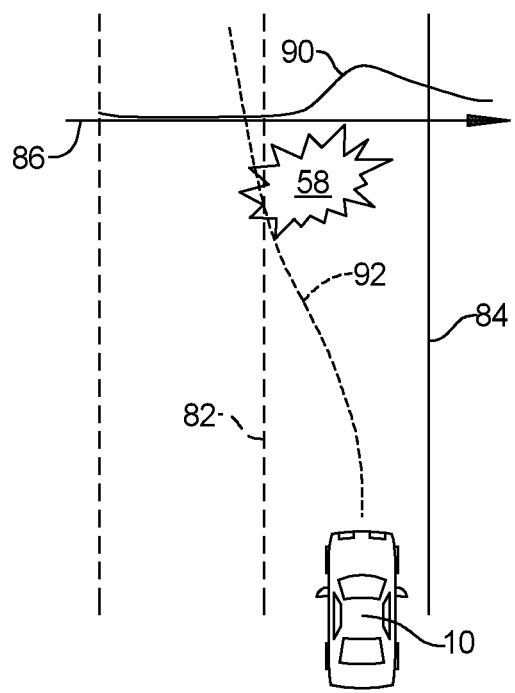
FIG. 9 is a schematic illustration of how a vehicle uses a lateral severity probability distribution to alter a route of the vehicle.

For example, referring to FIG. 6, the plurality of sensors 40a-40n within the vehicle 10 detects a first lane line 82 and a second lane line 84. A coordinate system 86 can be created, for example, with an origin at the first lane line 82, and relative positions of the left and right front wheels 16A, 16B can be calculated within the coordinate system 86. Referring to FIG. 7, input 88A, 88B from motion sensors mounted to suspension components at the left and right front wheels 16A, 16B are added to the coordinate system 86. Referring to FIG. 8, when multiple vehicles encounter this road defect 58, their readings can be added to this coordinate system 86, wherein, by way of non-limiting example, a kernel density estimation algorithm is used to generate a lateral severity probability distribution 90 for the road defect 58. Referring to FIG. 9, as the vehicle approaches the road defect, the system controller, by accessing the lateral severity probability distribution 90 for the road defect 58, via communication with a remote database 74B, alters the vehicle route, as indicated by line 92, to avoid the most severe portion of the road defect 58, or to avoid hitting the road defect 58 altogether.

In another exemplary embodiment, when determining a lateral position of the road defect 58 within the roadway 54, the system controller 34A is further adapted to receive data related to a relative severity of the road defect 58 at different lateral locations across the roadway 54 collected by other vehicles that are stored within a remote database 74B in communication with the system controller 34A. Such data includes past occurrences wherein the road defect 58 was detected, and relative severity laterally across the roadway 54 was measured and recorded by motion sensors within other vehicles that encounter the road defect 58 which are then used by the system controller 34A and a global machine learning model 76B to predict the longitudinal and lateral location of the road defect 58.

The global machine learning model 76B uses past instances of other vehicles encountering the road defect 58, and the data related to a relative severity of the road defect 58 at different lateral locations across the roadway 54 collected previously by such other vehicles stored within the remote database 74B to bolster real-time data collected by the at least one motion sensor 56 and more accurately calculate the lateral severity probability distribution 90 for the road defect 58. The global machine learning model 76B, based on past occurrences, is taught to recognize the road defect 58 based on real-time images 52A, 52B captured by the vehicle 10, allowing the system controller 34A and the global machine learning model 76B to accurately identify the road defect 58 in front of the vehicle 10 before the vehicle 10 physically encounters the road defect 58, and to assess the relative severity of the road defect 58 laterally across the lane, allowing autonomous vehicle systems (vehicle control module 80) to strategically re-route the vehicle 10 accordingly. Each time the vehicle 10 encounters the road defect 58, the system controller 34A updates the global machine learning model 76B to continuously improve the accuracy of the global machine learning model 76B and calculated lateral severity probability distribution 90. Data from the global machine learning model 76B can be uploaded to mapping applications, allowing the road defect 58 and relative lateral severity of the road defect 58 to be identified ahead of time by users or navigation systems.

Figure 10:
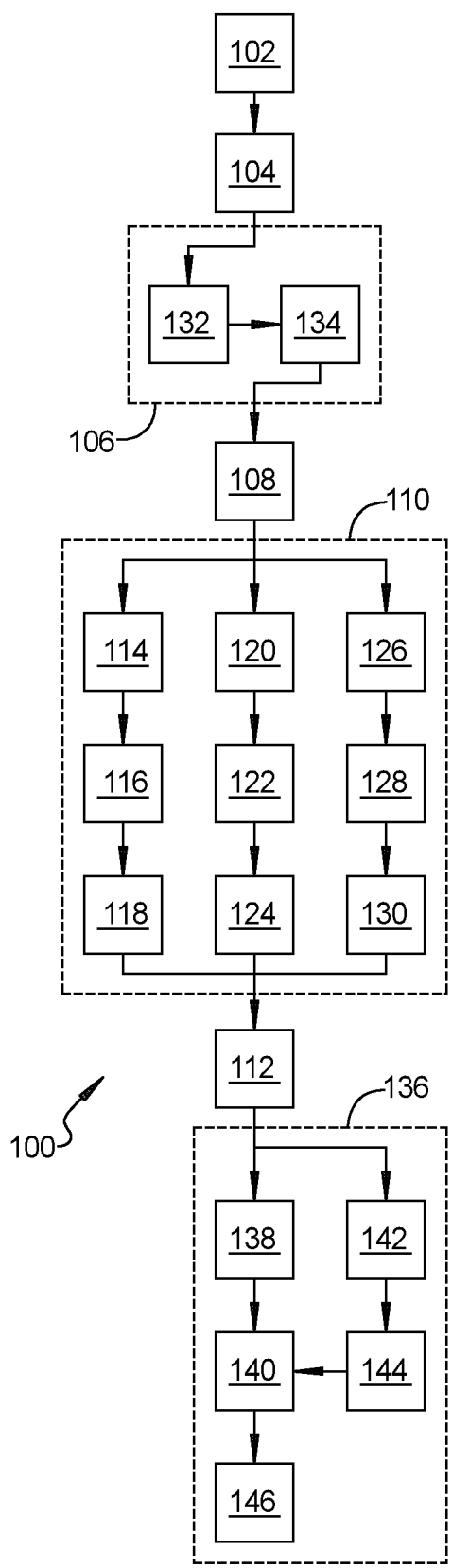
FIG. 10 is a flow chart illustrating a method according to an exemplary embodiment.

Referring to FIG. 10, a method 100 of identifying road defects 58 within a roadway 54 ahead of a moving vehicle 10 includes, beginning at block 102, capturing, with at least one camera 50 in communication with a system controller 34A, a plurality of time sequential images 52 of the roadway 54 ahead of the moving vehicle 10, moving to block 104, detecting, with at least one motion sensor 56 positioned within the vehicle 10 and in communication with the system controller 34A, when the vehicle 10 encounters a road defect 58, moving to block 106, correlating, with the system controller 34A, the road defect 58 detected by the at least one motion sensor 56 with at least one of the plurality of time sequential images 52 of the roadway 54 collected by the at least one camera 50, moving to block 108, analyzing, with the system controller 34A, using a computer vision algorithm 60, the at least one of the plurality of time sequential images 52 that is correlated to the road defect 58 detected by the at least one motion sensor 56, moving to block 110, identifying, with the system controller 34A and the computer vision algorithm 60, the road defect 58 within the at least one of the plurality of time sequential images 52 that is correlated to the road defect 58 detected by the at least one motion sensor 56, and, moving to block 112, labeling, with the system controller 34A, the identified road defect 58 within the at least one of the plurality of time sequential images 52 that is correlated to the road defect 58 detected by the at least one motion sensor 56.

In an exemplary embodiment, the identifying, with the system controller 34A and the computer vision algorithm 60, the road defect 58 within the at least one of the plurality of time sequential images 52 that is correlated to the road defect 58 detected by the at least one motion sensor 56 at block 110 further includes, moving from block 108 to block 114, receiving, with the system controller 34A, from a local database 70 in communication with the system controller 34A, data from images previously captured by the vehicle 10 wherein the road defect 58 has been labelled by the system controller 34A, and, moving to block 116, predicting, with the system controller 34A, using a machine learning model 72 in communication with the system controller 34A and the local database 70, the location of the road defect 58 in the at least one of the plurality of time sequential images 52 that is correlated to the road defect 58 detected by the at least one motion sensor 56.

In an exemplary embodiment, the method 100 further includes, moving from block 116 to block 118, updating the machine learning model 72 with data of the detected road defect 58 from the at least one motion sensor 56 and the at least one of the plurality of time sequential images 52 that is correlated to the road defect 58 detected by the at least one motion sensor 56.

In an exemplary embodiment, the identifying, with the system controller 34A and the computer vision algorithm 60, the road defect 58 within the at least one of the plurality of time sequential images 52 that is correlated to the road defect 58 detected by the at least one motion sensor 56 at block 110 further includes, moving from block 108 to block 120, receiving, with the system controller 34A, from a remote database 74 in communication with the system controller 34A, data from images previously captured by other vehicles wherein the road defect 58 has been identified and labelled, and, moving to block 122, predicting, with the system controller 34A, using a global machine learning model 76 in communication with the system controller 34A and the remote database 74 and trained with data from other vehicles stored within the remote database 74, the location of the road defect 58 in the at least one of the plurality of time sequential images 52 that is correlated to the road defect 58 detected by the at least one motion sensor 56.

In an exemplary embodiment, the method 100 further includes, moving to block 124, updating the global machine learning model 76 with data of the detected road defect 58 from the at least one motion sensor 56 and the at least one of the plurality of time sequential images 52 that is correlated to the road defect 58 detected by the at least one motion sensor 56.

In another exemplary embodiment, the identifying, with the system controller 34A and the computer vision algorithm 60, the road defect 58 within the at least one of the plurality of time sequential images 52 that is correlated to the road defect 58 detected by the at least one motion sensor 56 at block 110 further includes, moving from block 108 to block 126, receiving, with the system controller 34A, from a remote database 74A in communication with the system controller 34A, data from images previously captured by other vehicles with contextual features matching the vehicle 10 wherein the road defect 58 has been identified and labelled, and, moving to block 128, predicting, with the system controller 34A, using a contextual global machine learning model 76A in communication with the system controller 34A and the remote database 74A and trained with data from other vehicles stored within the remote database 74A, the location of the road defect 58 in the at least one of the plurality of time sequential images 52 that is correlated to the road defect 58 detected by the at least one motion sensor 56.

In an exemplary embodiment, the method 100 further includes, moving to block 130, updating the global machine learning model 76A with data of the detected road defect 58 from the at least one motion sensor 56 and the at least one of the plurality of time sequential images 52 that is correlated to the road defect 58 detected by the at least one motion sensor 56.

In an exemplary embodiment, the correlating, with the system controller 34A, the road defect 58 detected by the at least one motion sensor 56 with at least one of the plurality of time sequential images 52 of the roadway 54 collected by the at least one camera 50 at block 106 further includes, moving from block 104 to block 132, detecting, at time $t_n$, with the at least one motion sensor 56, the road defect 58, and, moving to block 134, calculating, with a position algorithm 62 in communication with the system controller 34A a pose of the at least one camera 50 at time $t_n$, a relative position of the road defect 58 relative to the at least one motion sensor 56 and the at least one camera 50 at time $t_n$, a pose of the at least one camera 50 for the at least one 52A, 52B of the plurality of time sequential images 52 that is correlated to the road defect 58 detected by the at least one motion sensor 56, at time $t_{n-x}$, and a relative position of the road defect 58 within the at least one 52A, 52B of the plurality of time sequential images 52 that is correlated to the road defect 58 detected by the at least one motion sensor 56, at time $t_{n-x}$.

In another exemplary embodiment, the method 100 further includes, moving from block 112 to block 136, determining, with the system controller 34A, a lateral position of the road defect 58 within the roadway 34.

In another exemplary embodiment, the determining, with the system controller 34A, a lateral position of the road defect 58 within the roadway 54 at block 136 further includes, moving from block 112 to block 138, receiving, with the system controller 34A, from the at least one motion sensor 56, data related to a relative severity of the road defect 58 at different lateral locations across the roadway 54, wherein the at least one motion sensor 56 includes a plurality of motion sensors located at different lateral positions within the vehicle 10, and, moving to block 140, calculating, with the system controller 34A, a lateral severity distribution 90 for the road defect 58.

In still another exemplary embodiment, the determining, with the system controller 34A, a lateral position of the road defect 58 within the roadway 54 at block 136 further includes, moving from block 112 to block 142, receiving, with the system controller 34A, from a remote database 74B in communication with the system controller 34A, data related to a relative severity of the road defect 58 at different lateral locations across the roadway 54 collected previously by other vehicles, moving to block 144, predicting, with the system controller 34A, using a global machine learning model 76B in communication with the system controller 34A and the remote database 74B and trained with data related to a relative severity of the road defect 58 at different lateral locations across the roadway 54 collected previously by other vehicles stored within the remote database 74B, a lateral severity distribution 90 for the road defect 58, and, moving to block 146, updating the global machine learning model 76B with data received from the plurality of motion sensors 56 located at different lateral positions within the vehicle 10.

A system 10 and method 100 of the present disclosure offers the advantage of correlating when a road defect 58 is "felt" by motion sensors 56 when a vehicle 10 physically encounters the road defect 58 to images 52A, 52B taken of the roadway 54 that include the road defect 58 prior to the vehicle 10 physically encountering the road defect 58. This provides the opportunity to obtain fine grained location information to precisely locate the road defect 58, teach a machine learning model 76, 76A, 76B to enable the system controller 34A to identify the road defect 58 before the vehicle 10 physically encounters the road defect 58, and to calculate a lateral severity probability distribution 90 enabling the system controller 34A to evaluate the severity of a road defect 58 laterally across a lane within the roadway 54. The system provides more accurate information regarding road defects 58 which allows an autonomous vehicle controller to more accurately identify road defects 58 and their relative severity and to more effectively react to road defects 58 identified within the roadway and to route-plan.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of identifying road defects within a roadway ahead of a moving vehicle, comprising:
    capturing, with at least one camera in communication with a system controller, a plurality of time sequential images of the roadway ahead of the moving vehicle;
    detecting, with at least one motion sensor positioned within the vehicle and in communication with the system controller, when the vehicle encounters a road defect;
    correlating, with the system controller, the road defect detected by the at least one motion sensor with at least one of the plurality of time sequential images of the roadway collected by the at least one camera;
    analyzing, with the system controller, using a computer vision algorithm, the at least one of the plurality of time sequential images that is correlated to the road defect detected by the at least one motion sensor;
    identifying, with the system controller and the computer vision algorithm, the road defect within the at least one of the plurality of time sequential images that is correlated to the road defect detected by the at least one motion sensor;
    labeling, with the system controller, the identified road defect within the at least one of the plurality of time sequential images that is correlated to the road defect detected by the at least one motion sensor; and
    determining, with the system controller, a lateral position of the road defect within the roadway, including:
        receiving, with the system controller, from the at least one motion sensor, data related to a relative severity of the road defect at different lateral locations across the roadway, wherein the at least one motion sensor includes a plurality of motion sensors located at different lateral positions within the vehicle;
        receiving, with the system controller, from a remote database in communication with the system controller, data related to a relative severity of the road defect at different lateral locations across the roadway collected previously by other vehicles;
predicting, with the system controller, using a global machine learning model in communication with the system controller and the remote database and trained with data related to a relative severity of the road defect at different lateral locations across the roadway collected previously by other vehicles stored within the remote database, a lateral severity distribution for the road defect; and
updating the global machine learning model with data received from the plurality of motion sensors located at different lateral positions within the vehicle.

2. The method of claim 1, wherein the identifying, with the system controller and the computer vision algorithm, the road defect within the at least one of the plurality of time sequential images that is correlated to the road defect detected by the at least one motion sensor further includes:
receiving, with the system controller, from a local database in communication with the system controller, data from images previously captured by the vehicle wherein the road defect has been labelled by the system controller; and
predicting, with the system controller, using a machine learning model in communication with the system controller and the local database, the location of the road defect in the at least one of the plurality of time sequential images that is correlated to the road defect detected by the at least one motion sensor.

3. The method of claim 2, further including updating the machine learning model with data of the detected road defect from the at least one motion sensor and the at least one of the plurality of time sequential images that is correlated to the road defect detected by the at least one motion sensor.

4. The method of claim 1, wherein the identifying, with the system controller and the computer vision algorithm, the road defect within the at least one of the plurality of time sequential images that is correlated to the road defect detected by the at least one motion sensor further includes:
receiving, with the system controller, from a remote database in communication with the system controller, data from images previously captured by other vehicles wherein the road defect has been identified and labelled; and
predicting, with the system controller, using a global machine learning model in communication with the system controller and the remote database and trained with data from other vehicles stored within the remote database, the location of the road defect in the at least one of the plurality of time sequential images that is correlated to the road defect detected by the at least one motion sensor.

5. The method of claim 4, further including updating the global machine learning model with data of the detected road defect from the at least one motion sensor and the at least one of the plurality of time sequential images that is correlated to the road defect detected by the at least one motion sensor.

6. The method of claim 1, wherein the identifying, with the system controller and the computer vision algorithm, the road defect within the at least one of the plurality of time sequential images that is correlated to the road defect detected by the at least one motion sensor further includes:
receiving, with the system controller, from a remote database in communication with the system controller, data from images previously captured by other vehicles with contextual features matching the vehicle wherein the road defect has been identified and labelled; and
predicting, with the system controller, using a contextual global machine learning model in communication with the system controller and the remote database and trained with data from other vehicle stored within the remote database, the location of the road defect in the at least one of the plurality of time sequential images that is correlated to the road defect detected by the at least one motion sensor.

7. The method of claim 1, wherein the correlating, with the system controller, the road defect detected by the at least one motion sensor with at least one of the plurality of time sequential images of the roadway collected by the at least one camera further includes:
detecting, at time tn, with the at least one motion sensor, the road defect; and
calculating, with a position algorithm in communication with the system controller:
a pose of the at least one camera at time tn;
a relative position of the road defect relative to the at least one motion sensor and the at least one camera at time tn;
a pose of the at least one camera for the at least one of the plurality of time sequential images that is correlated to the road defect detected by the at least one motion sensor, at time tn−x; and
a relative position of the road defect within the at least one of the plurality of time sequential images that is correlated to the road defect detected by the at least one motion sensor, at time tn−x.

8. The method of claim 1, wherein the detecting, with at least one motion sensor positioned within the vehicle and in communication with the system controller, when the vehicle encounters a road defect further includes detecting road roughness and impact with a road defect with at least one motion sensor adapted to collect data related to wheel rotational differences.

9. The method of claim 1, wherein the detecting, with at least one motion sensor positioned within the vehicle and in communication with the system controller, when the vehicle encounters a road defect further includes collecting data related to a road defect with at least one inertial sensor.

10. The method of claim 1, wherein the detecting, with at least one motion sensor positioned within the vehicle and in communication with the system controller, when the vehicle encounters a road defect further includes detecting road roughness and impact with data related to shock absorber displacement measurements taken at each wheel by an active suspension system.

11. A system for identifying road defects within a roadway ahead of a moving vehicle, comprising:
at least one camera in communication with a system controller and adapted to capture a plurality of time sequential images of the roadway ahead of the moving vehicle; and
at least one motion sensor in communication with the system controller and adapted to detect when the vehicle encounters a road defect;
the system controller adapted to:
correlate the road defect detected by the at least one motion sensor with at least one of the plurality of time sequential images of the roadway collected by the at least one camera;

analyze, using a computer vision algorithm, the at least one of the plurality of time sequential images that is correlated to the road defect detected by the at least one motion sensor;

identify, with the computer vision algorithm, the road defect within the at least one of the plurality of time sequential images that is correlated to the road defect detected by the at least one motion sensor;

label the identified road defect within the at least one of the plurality of time sequential images that is correlated to the road defect detected by the at least one motion sensor; and determine a lateral position of the road defect within the roadway, including:
receive, from the at least one motion sensor, data related to a relative severity of the road defect at different lateral locations across the roadway, wherein the at least one motion sensor includes a plurality of motion sensors located at different lateral positions within the vehicle;
receive, from a remote database in communication with the system controller, data related to a relative severity of the road defect at different lateral locations across the roadway collected previously by other vehicles;
predict, using a global machine learning model in communication with the system controller and the remote database and trained with data related to a relative severity of the road defect at different lateral locations across the roadway collected previously by other vehicles stored within the remote database, a lateral severity distribution for the road defect; and
update the global machine learning model with data received from the plurality of motion sensors located at different lateral positions within the vehicle.

12. The system of claim 11, wherein, when identifying the road defect within the at least one of the plurality of time sequential images that is correlated to the road defect detected by the at least one motion sensor, the system controller is further adapted to:
receive, from a local database in communication with the system controller, data from images previously captured by the vehicle wherein the road defect has been labelled by the system controller;
predict, using a machine learning model in communication with the system controller and the local database, the location of the road defect in the at least one of the plurality of time sequential images that is correlated to the road defect detected by the at least one motion sensor; and
update the machine learning model with data of the detected road defect from the at least one motion sensor and the at least one of the plurality of time sequential images that is correlated to the road defect detected by the at least one motion sensor.

13. The system of claim 11, wherein, when identifying the road defect within the at least one of the plurality of time sequential images that is correlated to the road defect detected by the at least one motion sensor, the system controller is further adapted to:
receive, from a remote database in communication with the system controller, data from images previously captured by other vehicles wherein the road defect has been identified and labelled;
predict, using a global machine learning model in communication with the system controller and the remote database and trained with data from other vehicles stored within the remote database, the location of the road defect in the at least one of the plurality of time sequential images that is correlated to the road defect detected by the at least one motion sensor; and
update the global machine learning model with data of the detected road defect from the at least one motion sensor and the at least one of the plurality of time sequential images that is correlated to the road defect detected by the at least one motion sensor.

14. The system of claim 11, wherein, when identifying the road defect within the at least one of the plurality of time sequential images that is correlated to the road defect detected by the at least one motion sensor, the system controller is further adapted to:
receive, from a remote database in communication with the system controller, data from images previously captured by other vehicles with contextual features matching the vehicle wherein the road defect has been identified and labelled;
predict, using a contextual global machine learning model in communication with the system controller and the remote database and trained with data from other vehicle stored within the remote database, the location of the road defect in the at least one of the plurality of time sequential images that is correlated to the road defect detected by the at least one motion sensor; and
update the contextual global machine learning model with data of the detected road defect from the at least one motion sensor and the at least one of the plurality of time sequential images that is correlated to the road defect detected by the at least one motion sensor.

15. The system of claim 11, wherein, when correlating the road defect detected by the at least one motion sensor with at least one of the plurality of time sequential images of the roadway collected by the at least one camera, the system controller is further adapted to:
detect, at time tn, with the at least one motion sensor, the road defect; and
calculate, with a position algorithm in communication with the system controller:
a pose of the at least one camera at time tn;
a relative position of the road defect relative to the at least one motion sensor and the at least one camera at time tn;
a pose of the at least one camera for the at least one of the plurality of time sequential images that is correlated to the road defect detected by the at least one motion sensor, at time tn−x; and
a relative position of the road defect within the at least one of the plurality of time sequential images that is correlated to the road defect detected by the at least one motion sensor, at time tn−x.

16. The system of claim 11, wherein the at least one motion sensor in communication with the system controller and adapted to detect when the vehicle encounters a road defect is further adapted to collect data related to wheel rotational differences.

17. The system of claim 11, wherein the at least one motion sensor in communication with the system controller and adapted to detect when the vehicle encounters a road defect is an inertial sensor.

18. The system of claim 11, wherein the at least one motion sensor in communication with the system controller and adapted to detect when the vehicle encounters a road defect is associated with an active suspension system and is adapted to collect data related to shock absorber displacement measurements taken at each wheel.

19. A vehicle having a system for identifying road defects within a roadway ahead of the vehicle when moving along the roadway, the system comprising:
- at least one camera in communication with a system controller and adapted to capture a plurality of time sequential images of the roadway ahead of the moving vehicle;
- at least one motion sensor in communication with the system controller and adapted to detect when the vehicle encounters a road defect;
- the system controller adapted to:
- correlate the road defect detected by the at least one motion sensor with at least one of the plurality of time sequential images of the roadway collected by the at least one camera, wherein the system controller is adapted to:
- detect, at time tn, with the at least one motion sensor, the road defect; and
- calculate, with a position algorithm in communication with the system controller:
- a pose of the at least one camera at time tn;
- a relative position of the road defect relative to the at least one motion sensor and the at least one camera at time tn;
- a pose of the at least one camera for the at least one of the plurality of time sequential images that is correlated to the road defect detected by the at least one motion sensor, at time tn−x; and
- a relative position of the road defect within the at least one of the plurality of time sequential images that is correlated to the road defect detected by the at least one motion sensor, at time tn−x;
- analyze, using a computer vision algorithm, the at least one of the plurality of time sequential images that is correlated to the road defect detected by the at least one motion sensor;
- identify, with the computer vision algorithm, the road defect within the at least one of the plurality of time sequential images that is correlated to the road defect detected by the at least one motion sensor by at least one of:
- receive, from a local database in communication with the system controller, data from images previously captured by the vehicle wherein the road defect has been labelled by the system controller, and predict, using a machine learning model in communication with the system controller and the local database, the location of the road defect in the at least one of the plurality of time sequential images that is correlated to the road defect detected by the at least one motion sensor;
- receive, from a remote database in communication with the system controller, data from images previously captured by other vehicles wherein the road defect has been identified and labelled, and predict, using a global machine learning model in communication with the system controller and the remote database and trained with data from other vehicles stored within the remote database, the location of the road defect in the at least one of the plurality of time sequential images that is correlated to the road defect detected by the at least one motion sensor; and
- receive, from a remote database in communication with the system controller, data from images previously captured by other vehicles with contextual features matching the vehicle wherein the road defect has been identified and labelled, and predict, using a contextual global machine learning model in communication with the system controller and the remote database and trained with data from other vehicle stored within the remote database, the location of the road defect in the at least one of the plurality of time sequential images that is correlated to the road defect detected by the at least one motion sensor;
- label the identified road defect within the at least one of the plurality of time sequential images that is correlated to the road defect detected by the at least one motion sensor;
- receive, from the at least one motion sensor, data related to a relative severity of the road defect at different lateral locations across the roadway, wherein the at least one motion sensor includes a plurality of motion sensors located at different lateral positions within the vehicle;
- receive, from a remote database in communication with the system controller, data related to a relative severity of the road defect at different lateral locations across the roadway collected previously by other vehicles;
- predict, using a global machine learning model in communication with the system controller and the remote database and trained with data related to a relative severity of the road defect at different lateral locations across the roadway collected previously by other vehicles stored within the remote database, a lateral severity distribution for the road defect;
- update the global machine learning model with data received from the plurality of motion sensors located at different lateral positions within the vehicle; and
- calculate a lateral severity distribution for the road defect to determine a lateral position of the road defect within the roadway based on data related to a relative severity of the road defect at different lateral locations across the roadway from the plurality of motion sensors located at different lateral positions within the vehicle and the predicted lateral severity distribution for the road defect.

20. The vehicle of claim 19, wherein the at least one motion sensor in communication with the system controller and adapted to detect when the vehicle encounters a road defect is one of:
- adapted to collect data related to wheel rotational differences;
- an inertial sensor; or
- adapted to collect data related to shock absorber displacement measurements taken at each wheel.

* * * * *